Figure 1:
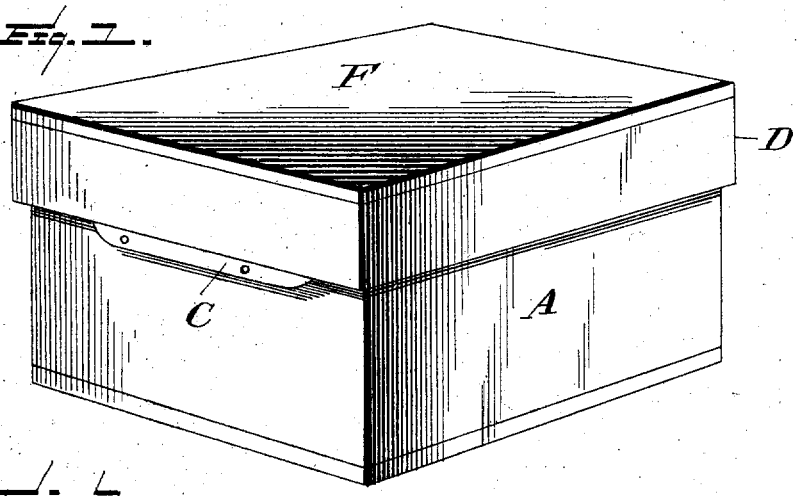

No. 11,815. Reissued Apr. 3, 1900.

W. A. SCHREI.

REFRIGERATOR CRATE.

(Application filed Sept. 30, 1899.)

Witnesses

L. C. Hills

J. M. Pfeiffer

Inventor

William A. Schrei, by Franklin H. Hough

Attorney

UNITED STATES PATENT OFFICE.

WILLIAM A. SCHREI, OF SOUTH OMAHA, NEBRASKA, ASSIGNOR OF ONE-HALF TO HIRAM MILLS, OF OMAHA, NEBRASKA.

REFRIGERATOR-CRATE.

SPECIFICATION forming part of Reissued Letters Patent No. 11,815, dated April 3, 1900.

Original No. 547,185, dated October 1, 1895. Application for reissue filed September 30, 1899. Serial No. 732,257.

*To all whom it may concern:*

Be it known that I, WILLIAM A. SCHREI, a citizen of the United States, residing at South Omaha, in the county of Douglas and State of Nebraska, have invented certain new and useful Improvements in Refrigerator-Crates; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in refrigerator-crates which are designed for use in shipping perishable products, the aim of the invention being to produce a shipping box or crate for the purpose described which will be simple in construction, which may be used in one shipment of perishable goods, and then at its destination be destroyed to save the expense of its return to the shipper.

A further object of the invention consists in the provision of a water-tight cold-conducting separator between the perishable products contained in the box or crate and the ice-receptacle above, the edges of the separator overlapping the edges of the box to prevent the water from the melting ice entering the receptacle containing the products being transported.

A further object is to dispense with the ice-jacket which it has heretofore been necessary to use and at the same time keep the interior of the box or crate dry and pure. This is accomplished by the discharge of the moisture over the edges of the plate or separator and which runs down upon the outside of the walls of the wooden box, saturating the said walls and creating an evaporation which reduces the temperature within, and by reason of the distribution of the ice over the entire upper surface of the contents of the box and separated from it only by the metal plate (the said plate being a ready conductor of heat and cold and the tendency of the cold air being downward) it prevents any access of warm air from above, while the top of the crate, being composed of wood, which is a bad conductor of heat and cold, confines and forces the cold air to descend uniformly over the entire surface of the provision-chamber. It is further augmented by the fact that any moisture arising on the inside of the package occasioned by the condensation of gases from the products transported or other causes is absorbed by the wood, thus keeping the provision-chamber perfectly dry.

To these ends and to such others as the invention may pertain the same consists, further, in the novel construction, combination, and adaptation of parts, as will be hereinafter more fully defined in the appended claims.

I clearly illustrate my invention in the accompanying drawings, which, with the letters of reference marked thereon, form a part of this application, and in which drawings similar letters of reference indicate like parts throughout the several views, in which—

Figure 2:
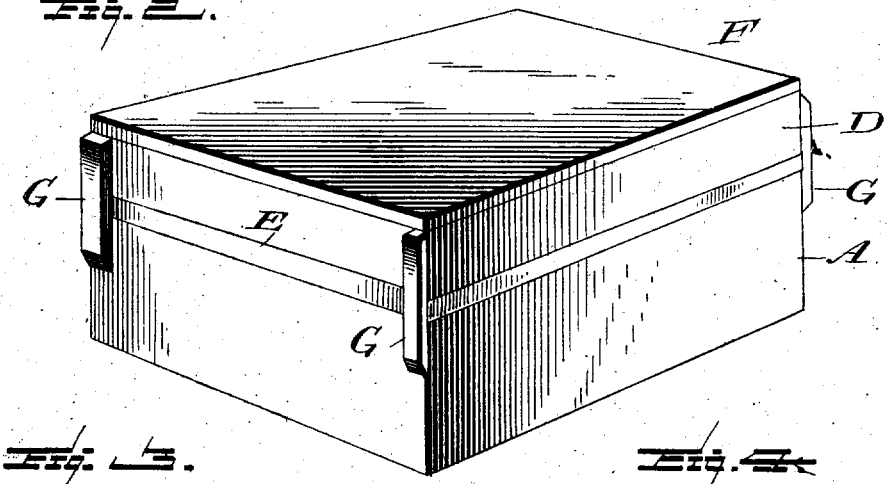
Figure 3:
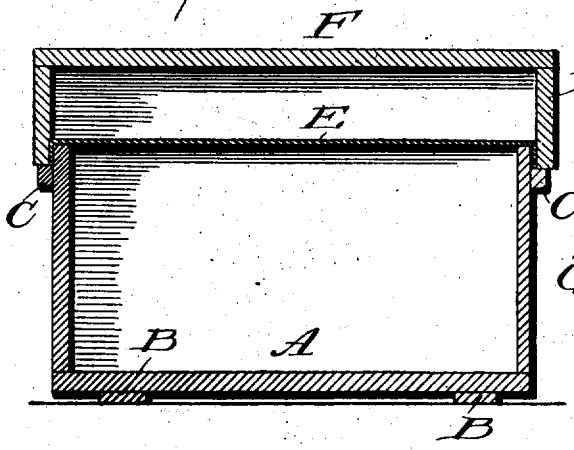
Figure 4:
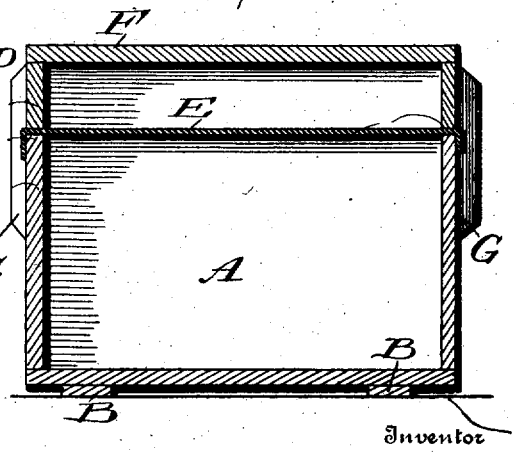

Figure 1 is a perspective view of the crate closed in shape for shipment with overlapping frame for ice-receptacle. Fig. 2 is a perspective view of the crate closed in shape for shipment with cleats for fastening ice-receptacle to box. Fig. 3 is a vertical longitudinal section through the crate with overlapping frame for ice-receptacle, and Fig. 4 is a vertical longitudinal section through the crate with cleats for fastening ice-receptacle to box.

Reference now being had to the details of the drawings by letter, A designates the box or receptacle, of wood, designed to hold the perishable products to be transported, and on its under side is provided with the cleats B.

D is a framework which is provided to retain the ice and is adapted to rest on the cleats C at each end of the box A, the ice resting on the sheet-iron or metallic cover E, which has its ends bent down over the ends of the box, so as to allow the water melting from the ice to be conveyed off and not allowed to enter the box containing the perishable products.

F is a cover, of wood, for the framework D and is designed to be nailed or otherwise secured thereto.

From the above it will be seen that the whole purpose of the invention is to provide a simple inexpensive refrigerator shipping-crate so constructed that the moisture resulting from the melting of the ice will serve to saturate the walls of the box and create an evaporation that will result in the reduction of the temperature within the box and the keeping of the interior dry and pure and at the same time producing a crate which can be constructed so cheaply that it would not pay to return the crate for a second shipping.

The ice-retaining frames may be securely held to the sides of the box or fastened by means of cleats G, which are perpendicularly secured at their upper ends to the outer corners of the ice-retaining frame, the free ends of said cleats extending down over the meeting edges of the frame, metallic cover, and box and adapted to be secured to the said box by any suitable means, and the ice contained within its inclosing sides and on the metallic separator will cause the contents of the box to be kept cool by the natural tendency of atmosphere to settle.

In Figs. 1 and 3 of the drawings I have shown a slight modification in the form of the crate. In this modified form the vertical cleats G at the corners of the crate are dispensed with and the upper portion of the crate is fitted down over the upper edges of the lower portion resting upon the horizontal strips C, as shown in the drawings.

Having thus described my invention, what I claim to be new, and desire to secure by Letters Patent, is—

1. As an improved article of manufacture, a refrigerator shipping box or crate comprising a box, a covered ice-receptacle and an intermediate, removable, water-tight, heat-conducting separator, resting on and overlapping the edges of the box and constituting both a close cover for the box and a bottom for the ice-receptacle, and means for securing the parts in place, whereby the contents of the box are made cold and kept cold and the water from the melting ice is prevented from entering the box and is conveyed off, as and for the purpose described.

2. As an improved article of manufacture, a refrigerator shipping box or crate made of wood, a covered ice-receptacle and an intermediate, removable, water-tight, heat-conducting metallic separator, resting upon and overlapping the edges of the box, the overlapping edges of the separator being bent down over the edges of the box and constituting both a close cover for the box and a bottom for the ice-receptacle, and means for securing the parts in place, whereby the contents of the box are made cold and kept cold and the water from the melting ice is prevented from entering the box and is delivered against the exterior of the sides of the box, as and for the purpose described.

3. As an improved article of manufacture a refrigerator shipping-crate having in combination with the box A, a metallic plate E with its edges bent over the upper edges of said box, an inclosing frame D adapted to rest on said metallic plate, the cleats G secured at each corner of said frame, and their free ends extended down over the meeting edges of said frame, plate and box, and of a cover F, all substantially as shown and described.

WILLIAM A. SCHREI.

Witnesses:
W. L. DAVIES,
L. H. WATTS.